(12) United States Patent
Großpietsch et al.

(10) Patent No.: US 11,807,099 B2
(45) Date of Patent: Nov. 7, 2023

(54) ROTOR SUPPORT FOR AN ELECTRICAL MACHINE

(71) Applicant: ZF FRIEDRICHSHAFEN AG, Friedrichshafen (DE)

(72) Inventors: Wolfgang Großpietsch, Schweinfurt (DE); Angelika Ebert, Schonungen (DE); Monika Rößner, Donnersdorf (DE); Christoph Margraf, Markdorf (DE); Thomas Bauer, Großbardorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 488 days.

(21) Appl. No.: 17/259,025

(22) PCT Filed: Jul. 8, 2019

(86) PCT No.: PCT/EP2019/068255
§ 371 (c)(1),
(2) Date: Jan. 8, 2021

(87) PCT Pub. No.: WO2020/011712
PCT Pub. Date: Jan. 16, 2020

(65) Prior Publication Data
US 2021/0268889 A1 Sep. 2, 2021

(30) Foreign Application Priority Data
Jul. 10, 2018 (DE) .................. 10 2018 211 376.9

(51) Int. Cl.
*B60K 6/26* (2007.10)
*H02K 5/20* (2006.01)
(Continued)

(52) U.S. Cl.
CPC .............. *B60K 6/26* (2013.01); *H02K 5/203* (2021.01); *H02K 7/006* (2013.01); *H02K 7/10* (2013.01);
(Continued)

(58) Field of Classification Search
CPC .......... H02K 5/203; H02K 5/04; H02K 7/006; H02K 7/10; H02K 7/108; H02K 9/19
See application file for complete search history.

(56) References Cited

U.S. PATENT DOCUMENTS

| 8,556,010 B2 * | 10/2013 | Ebert ................. B60K 6/40 |
| | | 180/65.25 |
| 10,944,310 B2 * | 3/2021 | Ideue ................. H02K 9/197 |

(Continued)

FOREIGN PATENT DOCUMENTS

| DE | 10128424 | 12/2002 |
| DE | 102004055179 | 5/2006 |

(Continued)

OTHER PUBLICATIONS

Office Action of the corresponding German Patent Application No. 10 2018 211 376.9.

*Primary Examiner* — Huan Le
(74) *Attorney, Agent, or Firm* — Cozen O'Connor

(57) ABSTRACT

A rotor carrier for a rotor of an electric machine and to a hybrid module with such a rotor carrier. The rotor carrier includes a pot-shaped base body. The base body overlaps only a portion of the axial extension of the rotor, in that the rotor carrier comprises a second supporting body that has elements on an outer circumferential surface for a positive engagement connection and/or frictional engagement connection between supporting body and rotor, in that the supporting body has a radially extending flange, and in that (Continued)

the bottom of the base body and the flange of the supporting body are connected to one another.

12 Claims, 4 Drawing Sheets

(51) Int. Cl.
    *H02K 7/00*           (2006.01)
    *H02K 7/10*           (2006.01)
    *H02K 7/108*         (2006.01)
    *H02K 9/19*           (2006.01)
    *F16D 13/52*         (2006.01)

(52) U.S. Cl.
    CPC ............... *H02K 7/108* (2013.01); *H02K 9/19* (2013.01); *B60Y 2200/92* (2013.01); *B60Y 2400/60* (2013.01); *F16D 13/52* (2013.01)

(56) References Cited

U.S. PATENT DOCUMENTS

| | | |
|---|---|---|
| 2008/0099258 A1 | 5/2008 | Berhan |
| 2012/0080248 A1* | 4/2012 | Kasuya .................... H02K 9/19 |
| | | 903/902 |

FOREIGN PATENT DOCUMENTS

| | | |
|---|---|---|
| DE | 102005040771 | 3/2007 |
| DE | 102007032130 | 1/2009 |
| DE | 112010003514 | 10/2012 |
| DE | 102013201667 | 8/2014 |
| DE | 102013006857 | 10/2014 |
| DE | 102013221643 | 4/2015 |
| DE | 102014215292 | 2/2016 |
| DE | 102015209898 | 12/2016 |
| WO | WO 2015018575 | 2/2015 |

\* cited by examiner

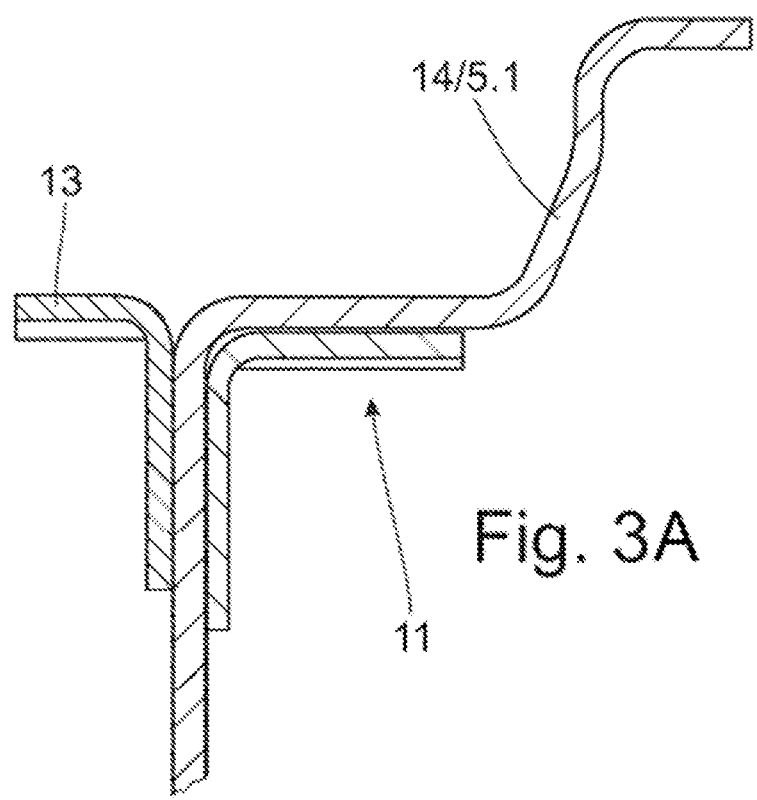

ROTOR SUPPORT FOR AN ELECTRICAL MACHINE

CROSS REFERENCE TO RELATED APPLICATIONS

This is a U.S. national stage of Application No. PCT/EP2019/068255 filed Jul. 8, 2019. Priority is claimed on German Application No. DE 10 2018 211 376.9 filed Jul. 10, 2018 the content of which is incorporated herein by reference.

BACKGROUND OF THE INVENTION

1. Field of the Invention

The invention is directed to a rotor carrier for an electric machine, particularly in a hybrid powertrain of a vehicle.

2. Description of Related Art

Besides solid rotors, annular rotors which are arranged around an axis of rotation are known in the prior art in electric machines. It is known, for example, from DE 10 2013 221 643 A1 that a lamination stack of a rotor is received on an outer plate carrier and connected to the rotational axis.

SUMMARY OF THE INVENTION

It is the object of one aspect of the invention to provide an alternative to the prior art which has a better support of the rotor, makes optimal use of installation space and is also simple and economical to produce.

According to one aspect of the invention, a rotor carrier for a rotor of an electric machine comprises a pot-shaped base body, the base body has an engagement element on an outer circumferential surface facing the rotor which make possible a positive engagement connection and/or frictional engagement connection between the base body and rotor, receptacles for parts of a clutch are provided on an inner circumferential surface remote of the rotor over a portion of the axial extension, and the base body is connected to a hub by a radially extending bottom. The invention is characterized in that the base body overlaps only a portion of the axial extension of the rotor, in that the rotor carrier comprises a second supporting body which likewise has engagement elements on an outer circumferential surface which make possible a positive engagement connection and/or frictional engagement connection between supporting body and rotor, in that the supporting body has a radially extending flange, and in that the bottom of the base body and the flange of the supporting body are connected to one another.

A profiling, for example, is provided at the base body for the connection between the base body and the rotor with which projections and/or recesses are provided at least on the outer circumferential surface, which projections and/or recesses cooperate with corresponding mating pieces on the inner surface of the rotor in order to produce a positive engagement connection. Alternatively or cumulatively, projections or recesses such as steps or annular grooves can also be provided in circumferential direction and are usable for a positive engagement connection or frictional engagement connection. A frictional engagement connection in which the rotor is connected to the base body via clamping elements, screws, rivets, or the like can also be provided instead of a positive engagement connection. Material bond connections in which the rotor is welded to the base body are also possible in principle. Combinations in which different types of connections are used, for example, to form or secure connections in different directions, are also possible.

The base body is connected to a hub by a radially extending bottom in order to be able to transmit a torque. In this context, the term "hub" means and comprehends not only a conventional hub mounted on a shaft but also a direct connection to a shaft or also the connection to a component part downstream in the powertrain, for example, a converter housing.

The bottom is preferably integral with the base body so that the base body has a pot-like shape. Embodiment forms in which the bottom is manufactured separately and is fixedly connected to the base body, for example, by welding, are also possible.

Receptacles for parts of a clutch are provided at the inner circumferential surface of the axial portion of the base body. These parts are preferably grooves or projections in axial direction which serve to receive plates of a multiple-plate clutch. Accordingly, the base body is simultaneously the outer plate carrier of a clutch. The clutch can interrupt a power flow from or to an internal combustion engine located upstream in the powertrain, for example.

The base body only extends over a portion of the axial extension of the rotor, and the base body can protrude over the rotor in axial direction. The radially extending bottom is preferably provided at an axial end of the base body. The bottom is preferably arranged inside of the rotor in axial direction so that an advantageous power flow can be achieved.

To support the rotor over the entire axial length, the rotor carrier has a supporting body which is formed as a separate component part, and the rotor carrier is accordingly constructed from two parts.

On an outer circumferential surface, the supporting body likewise has engagement elements that provide a positive engagement connection and/or frictional engagement connection between supporting body and rotor. These engagement elements are preferably constructed analogous to the above-described means at the base body.

The supporting body further comprises a radially extending flange for connecting the supporting body to the bottom of the base body so that the base body and the supporting body are fixedly arranged relative to one another and a rotor carrier is formed for the rotor. The connection between base body and supporting body is preferably carried out by riveting, screwing or welding, although other types of connections are possible. The two-part construction of the rotor carrier simplifies the geometry of the individual component parts, and it is possible at the same time to use the individual component parts possibly also in other variants of a hybrid module owing to a modular construction.

Embodiment forms of a rotor carrier are characterized in that the supporting body has, as separate component part, a flange which is formed shorter or longer in radial direction than the bottom of the base body. The rotor carrier is connected to a hub. For this connection, the bottom or the flange preferably extends through to the hub or is connected to a converter housing which is fixedly connected to the hub. In addition to an identical radial length of bottom and flange in which both of the latter are connected to the hub, it is preferred that only the bottom of the base body or the flange of the supporting body extends through to the hub, since material and axial installation space can possibly be saved at the hub in this way.

Rotor carriers according to further embodiment forms are characterized in that a converter housing is formed as supporting body. Instead of a separate component part as supporting body, the converter housing can be formed as supporting body at its end facing the clutch. In this case, the elements for receiving the rotor are correspondingly formed on a circumferential surface of the converter housing which has a diameter identical to that of the base body. In these embodiment forms, the flange of the supporting body is correspondingly provided at the axial end of the converter housing, and the bottom of the base body is directly connected to the converter housing and to the flange at the converter housing, respectively. In this way, the quantity of component parts can be reduced and installation space can be saved. Further, the supporting body as component part of the converter housing has a high stiffness.

Embodiment forms of a rotor carrier are characterized in that the base body has a different thickness than the supporting body. Depending on the occurring loads and the amount of axial support of the rotor, the base body and the supporting body can be constructed with different thicknesses. Compared to a rotor carrier which extends in one part over the axial length, material and, therefore, weight and costs can be saved by the different thicknesses because of the adaptation to the load.

Rotor carriers according to embodiment forms are characterized in that the base body and the supporting body are connected to one another by riveting. Using riveting, the component parts can be securely connected to one another simply and quickly without introducing large amounts of heat.

Rotor carriers according to embodiment forms are characterized in that the base body and the supporting body are connected to one another by welding. By welding, the component parts can be connected to one another simply and securely without having to use additional component parts such as screws or rivets.

Embodiment forms of a rotor carrier are characterized in that the base body has a larger axial overlap with the rotor than the supporting body. In principle, the division between base body and supporting body in axial direction can be selected as desired. However, with respect to the required installation space, it is advantageous when the base body overlaps a larger proportion of the rotor in axial direction because the base body simultaneously surrounds parts of the clutch.

In embodiment forms, rotor carriers are characterized in that the base body and/or the supporting body are formed longer than the rotor at least at one axial end. Because of the axial overlap, an at least partial mechanical protection is afforded for the ends of the rotor. Further, the possibility for mounting retaining elements such as retaining rings and the like is provided at the axial overlap. The protruding rotor carrier can also be used in particular for balancing the rotor by fixing balancing weights to the protruding rotor carrier or by local removal of material.

Rotor carriers according to embodiment forms are characterized in that the base body and/or the supporting body has at least one cutout which is continuous in radial direction for the passage of oil. At least one cutout is provided in order to guide oil from the inner side to the outer side for lubrication and cooling. This cutout is preferably arranged in the area of an axial end of the lamination stack of the rotor or so as to lead into an oil channel formed between the rotor carrier and the lamination stack.

Rotor carriers according to preferred embodiment forms are characterized in that the cutout is arranged in the bottom area of a groove provided at the inner circumferential surface. In addition to the cutouts, guiding elements can be provided at the supporting body or base body in order to guide oil impinging from the inside to the cutouts or to selectively deliver oil outward. These guiding elements can be constructed as channels, annular grooves or recesses, preferably so as to be inclined toward the cutout. Alternatively, raised guiding elements are also possible as struts, projections or steps. These guiding elements can possibly serve at the same time as receptacles for the parts of a clutch.

Preferred embodiment forms of a rotor carrier are characterized in that a plurality of cutouts are arranged so as to be distributed over the circumference. For a more uniform distribution of the oil and in order to prevent unbalance, a plurality of cutouts are distributed, preferably symmetrically, over the circumference. In this regard, a plurality of cutouts can also be provided at different axial positions so that the cooling can be improved on both sides, for example.

A further aspect of the invention is a hybrid module comprising an input shaft, a clutch, an electric machine, a torque converter and an output shaft, which is characterized in that a rotor carrier is provided according to one of the embodiment forms described above. Accordingly, the above-described advantages with respect to axial installation space and the like can be utilized in a hybrid module.

The embodiment forms are not limited to the examples given above and may be achieved through further corresponding constructions. The features of the embodiment forms may be combined in any desired manner.

BRIEF DESCRIPTION OF THE FIGURES

The invention will be described in more detail in the following referring to drawings. Like or similar elements are designated by consistent reference numerals. The drawings show:

FIG. 3A is a detail of an embodiment example.

DETAILED DESCRIPTION OF THE PRESENTLY PREFERRED EMBODIMENTS

Figure 1:
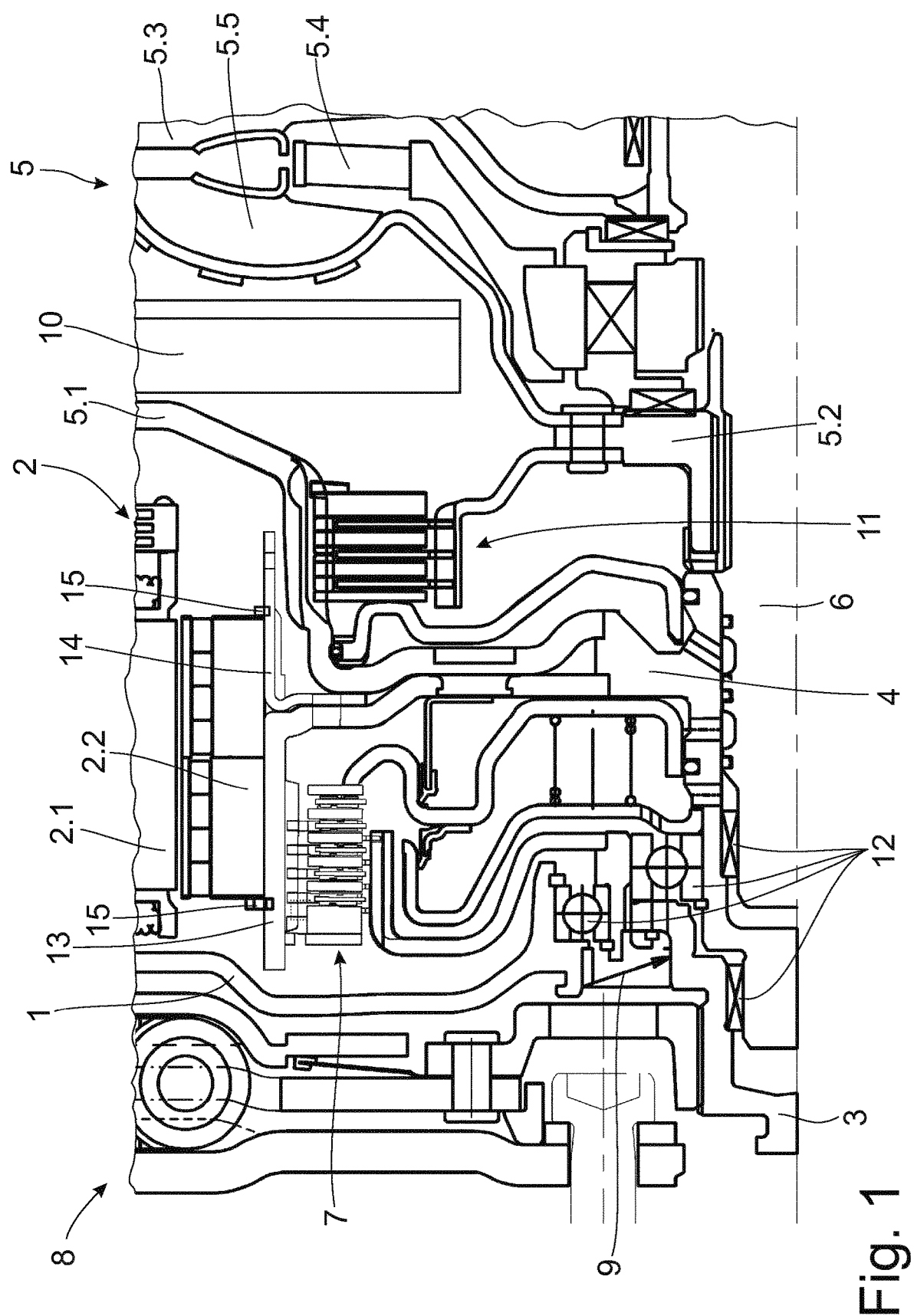
FIG. 1 is a schematic section of a hybrid module.

FIG. 1 shows a hybrid module according to an embodiment example in a schematic sectional view, one half of which has been omitted in view of symmetry. The hybrid module comprises a housing 1 within which is arranged an electric machine 2 with a stator 2.1, which is fixed with respect to rotation relative to the housing 1, and a rotatable rotor 2.2.

The hybrid module has a torque converter 5. The converter housing 5.1 is connected to a hub 4. An impeller 5.3 of the torque converter 5 is fixedly connected to a converter housing 5.1 of the torque converter 5. A stator wheel 5.4 of the torque converter 5 is supported so as to be fixed with respect to relative rotation in one rotational direction via a freewheel. A turbine wheel 5.5 of the torque converter 5 is connected to a turbine shaft 5.2 of the torque converter 5. The hybrid module further has an additional, optional torsional vibration mass damper 10 which is arranged within and on the converter housing 5.1. The turbine shaft 5.2 is connected to an output shaft 6 of an automatic transmission, not shown in more detail. Further, a lockup clutch 11 is arranged inside of the converter housing 5.1. The converter housing 5.1 is directly connectable to the turbine shaft 5.2 by engaging the lockup clutch 11.

The hub 4 is formed as a hollow shaft which is arranged coaxial to the output shaft 6 and so as to enclose the latter. In the depicted example, the input shaft 3 is likewise constructed as a hollow shaft and is arranged coaxial to the hub 4. A plurality of bearings 12 are arranged between the output shaft 6 and the hub 4, between the hub 4 and the input shaft 3 and between the input shaft 3 and the housing 1 and support the component parts relative to one another. The hub 4 is connected on its outer side to the converter housing 5.1 and to one side of the clutch 7.

A vibration damper 8, which is connected to an internal combustion engine, not shown, is provided on the input shaft 3. Possible torsional vibrations are reduced by the vibration damper 8 in order to supply the hybrid module with a torque or rotational movement that is as uniform as possible. At the same time, positional tolerances and alignment tolerances between the internal combustion engine and the hybrid module can be compensated by the vibration damper 8.

The housing 1 separates a wet space of the hybrid module from a dry space. The wet space is sealed relative to the dry space by a seal 9, which is arranged preferably directly adjacent to a bearing 12.

A clutch 7 by which the internal combustion engine can be disconnected from the rest of the powertrain is also provided inside the housing 1. To this end, the clutch 7 is arranged in the power flow between the input shaft 3 and the hub 4. More precisely, the parts of the clutch 7 are correspondingly connected to the input shaft 3 and to a rotor carrier. In the depicted embodiment example, the clutch 7 is constructed as a multiple-plate clutch.

The rotor 2.2 of the electric machine 2 is connected to a rotor carrier. In the depicted embodiment example, the rotor carrier is formed by a base body 13 and a supporting body 14, each of which has a pot-like basic shape and supports part of the axial length of the rotor 2.2. The base body 13 and the supporting body 14 have an annular outer contour with an identical outer diameter, the rotor 2.2 being mounted on the outer circumferential surface thereof. The base body 13 in this instance has a larger axial length than the supporting body 14 and, correspondingly, approximately two thirds of the rotor 2.2 are supported by the base body 13 and one third of the rotor 2.2 supported by the supporting body 14. The area of the rotor 2.2 supported by the base body 13 is preferably in the range of from 25% to 75% of the axial length of the rotor 2.2 so that the bottom of the base body 13 is arranged in the central area of the rotor 2.2.

The radially extending bottom of the base body 13 and the flange of the supporting body 14 face one another and are connected to one another. A connection to the hub 4 is carried out via the bottom of the base body 13. Both the base body 13 and the supporting body 14 protrude in axial direction relative to the rotor 2.2; in other words, together they have a larger axial length than the rotor 2.2.

In order to secure the axial position of the rotor 2.2 on the base body 13, a retaining element 15 is provided in a groove. The retaining element 15 can be constructed such that it is at least partially elastic in order to compensate for manufacturing tolerances and the like. An axial retention is also provided on the opposite side of the rotor 2.2 by a corresponding retaining element 15. Instead of a retaining element 15, one or more projections, steps or the like can also be provided at least on one side. Alternatively, the axially protruding area of the base body 13 or of the supporting body 14 can also be reformed radially outward so as to form a collar for axial limiting.

In the depicted embodiment example, the supporting body 14 is formed with a wall thickness which is thinner than that of the base body 13 so that material as well as weight are saved. In principle, the two component parts of the rotor carrier can also be constructed with an identical wall thickness.

By corresponding cutouts or balancing elements, not shown, the axially protruding areas can also be utilized for guiding oil for lubricating and cooling the electric machine 2 or for balancing the electric machine 2.

An axial portion of the base body 13 is provided with a profiling in order to form projections and recesses in the manner of a spline which are distributed over the circumference. These projections and recesses serve to receive parts of the clutch 7—the outer plates of the clutch 7 in the depicted example—so that the base body 13 constitutes the outer plate carrier of the clutch 7.

In FIG. 1, the flange of the supporting body 14 is constructed with a smaller radial extension than the bottom of the base body 13. The flange is connected to the bottom of the base body 13 via rivets, not shown. Instead of rivets, the connection can also be carried out in particular by welding, screwing or clinching.

Figure 2:
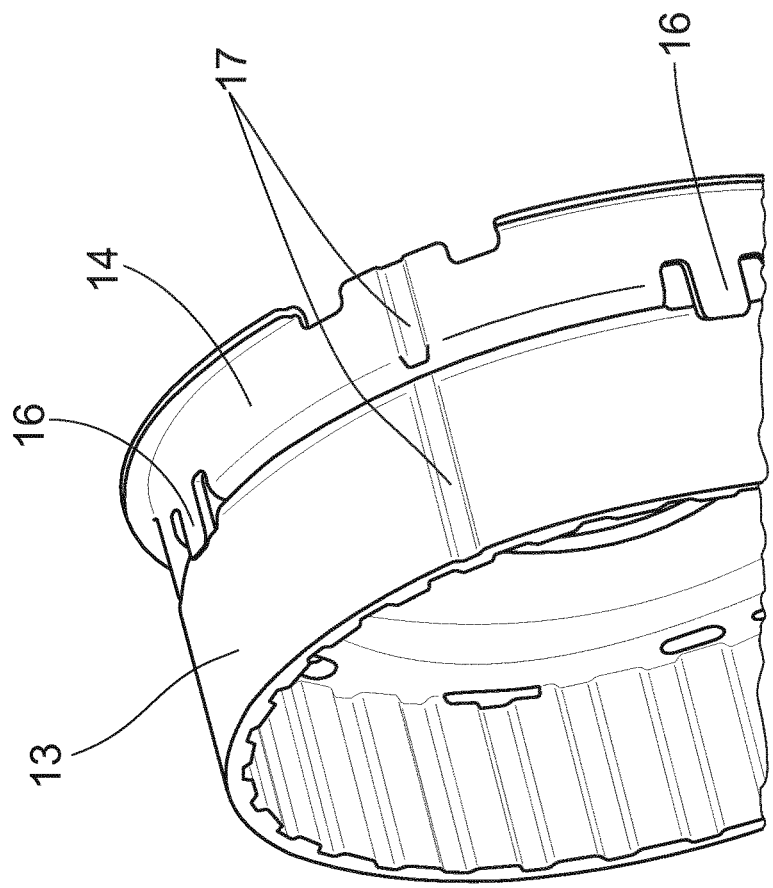
FIG. 2 is a rotor carrier.
Figure 2A:
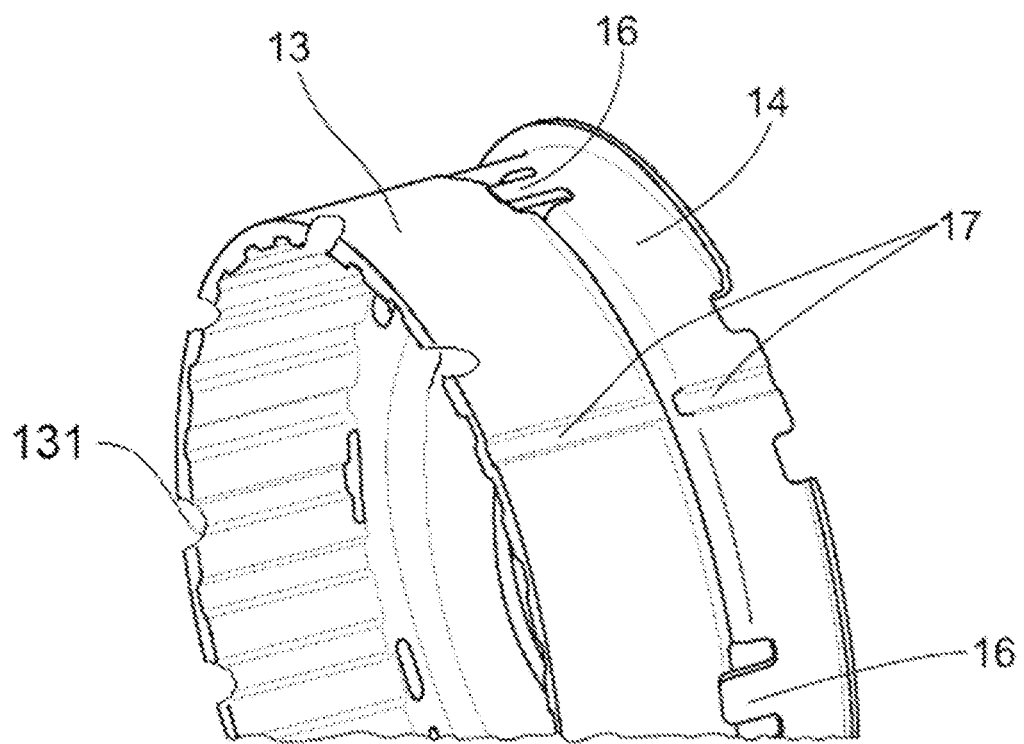
FIG. 2A is a rotor carrier.

FIG. 2 and FIG. 2A show further embodiment example of a rotor carrier, FIG. 2A including cutouts 131. The basic construction is the same, and reference is made to the above description referring to FIG. 1.

In contrast to the example from FIG. 1, the area axially protruding over the rotor 2.2 is reformed radially outward in the supporting body 14 to form a step.

Further, tongues 16 are arranged at the supporting body 14 so as to be distributed over the circumference in order to facilitate the alignment and positioning of the base body 13 relative to the supporting body 14. Alternatively or additionally, an alignment groove 17 that extends over both component parts can be used for this purpose and can also be utilized for positioning the rotor 2.2.

Figure 3:
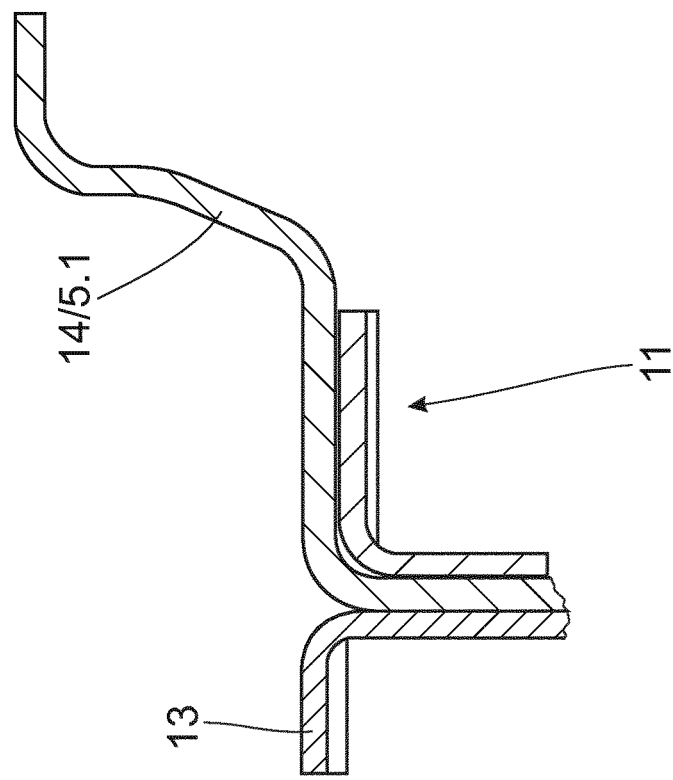
FIG. 3 is a detail of an embodiment example.

A subarea of a further embodiment example is shown in FIG. 3. However, the supporting body 14 is formed integral with the converter housing 5.1 or a portion of the converter housing 5.1 forms the supporting body 14. The base body 13 is connected directly to the converter housing 5.1 in this case. As is shown, the connection of the bottom and the flange can be carried out by welding or also by other connection methods which were mentioned above or combinations thereof. As shown in FIG. 3A, the supporting body 14 has a flange that is formed longer in radial direction than the bottom of the pot-shaped base body 13.

As in FIG. 1, recesses and projections are provided on the inner circumferential surface of the base body 13 as receptacle for parts of the clutch 7.

Projections and recesses, in this case in the form of axially extending grooves, are provided at the base body 13 and supporting body 14 for receiving and fastening the rotor 2.2 on the outer circumferential surface.

Portions of the lockup clutch 11 are shown inside the converter housing 5.1.

The invention is not limited to the embodiments described herein. As has already been stated, only individual advantageous features can also be provided, or various features from different examples may be combined with one another.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A rotor carrier for a rotor of an electric machine, comprising:
   a pot-shaped base body, having first engagement elements on an outer circumferential surface facing the rotor configured for a positive engagement connection and/or frictional engagement connection between base body and rotor;
   an inner circumferential surface remote of the rotor defines receptacles for parts of a clutch over a portion of an axial extension of the inner circumferential surface;
   a radially extending bottom by which the pot-shaped base body is connected to a hub;
   wherein the pot-shaped base body overlaps only a portion of an axial extension of the rotor,
   wherein the rotor carrier comprises a second supporting body having second engagement elements on an outer circumferential surface configured for a positive engagement connection and/or frictional engagement connection between supporting body and rotor,
   wherein the second supporting body has a radially extending flange, and
   wherein the bottom of the pot-shaped base body and the radially extending flange of the supporting body are connected to one another.

2. The rotor carrier according to claim 1, wherein the supporting body has, as a separate component part, a flange that is formed shorter or longer in radial direction than the bottom of the pot-shaped base body.

3. The rotor carrier according to claim 1, wherein a converter housing is formed as supporting body.

4. The rotor carrier according to claim 3, wherein the pot-shaped base body has a different thickness than the supporting body.

5. The rotor carrier according to claim 1, wherein the pot-shaped base body and the supporting body are connected to one another by riveting.

6. The rotor carrier according to claim 1, wherein the pot-shaped base body and the supporting body are connected to one another by welding.

7. The rotor carrier according to claim 1, wherein the pot-shaped base body has a larger axial overlap with the rotor than the supporting body.

8. The rotor carrier according to claim 1, wherein the pot-shaped base body and/or the supporting body are formed longer than the rotor at least at one axial end.

9. The rotor carrier according to claim 1, wherein the pot-shaped base body and/or the supporting body has at least one cutout which is continuous in a radial direction for a passage of oil.

10. The rotor carrier according to claim 9, wherein the at least one cutout is arranged in a bottom area of a groove provided at the inner circumferential surface.

11. The rotor carrier according to claim 9, wherein a plurality of cutouts are arranged so as to be distributed over a circumference.

12. A hybrid module comprising:
   an input shaft;
   a clutch;
   an electric machine;
   a torque converter;
   an output shaft; and
   a rotor carrier comprising:
   a pot-shaped base body, having first engagement elements on an outer circumferential surface facing a rotor configured for a positive engagement connection and/or frictional engagement connection between base body and rotor;
   an inner circumferential surface remote of the rotor defines receptacles for parts of the clutch over a portion of an axial extension of the inner circumferential surface;
   a radially extending bottom by which the pot-shaped base body is connected to a hub;
   wherein the pot-shaped base body overlaps only a portion of an axial extension of the rotor,
   wherein the rotor carrier comprises a second supporting body having second engagement elements on an outer circumferential surface configured for a positive engagement connection and/or frictional engagement connection between supporting body and rotor,
   wherein the second supporting body has a radially extending flange, and
   wherein the bottom of the pot-shaped base body and the radially extending flange of the supporting body are connected to one another.

* * * * *